United States Patent
Asher et al.

[11] Patent Number: 6,014,246
[45] Date of Patent: Jan. 11, 2000

[54] THERMALLY SWITCHABLE OPTICAL DEVICES

[75] Inventors: Sanford A. Asher; Jesse M. Weissman, both of Pittsburgh, Pa.; Hari B. Sunkara, Huntsville, Ala.

[73] Assignee: University of Pittsburgh of the Commonwealth System of Higher Education, Pittsburgh, Pa.

[21] Appl. No.: 08/744,586

[22] Filed: Nov. 6, 1996

[51] Int. Cl.[7] .................................................. C02F 1/01
[52] U.S. Cl. ................................. 359/288; 350/362
[58] Field of Search ............................ 359/288; 350/362

[56] References Cited

U.S. PATENT DOCUMENTS

| | | | |
|---|---|---|---|
| 3,620,597 | 11/1971 | Schwartz et al. | 350/160 |
| 4,268,413 | 5/1981 | Dabisch | 252/408 |
| 4,548,473 | 10/1985 | Lo et al. | 350/311 |
| 4,627,689 | 12/1986 | Asher | 350/362 |
| 4,632,517 | 12/1986 | Asher | 350/362 |
| 4,648,686 | 3/1987 | Segawa | 350/96.13 |
| 4,720,355 | 1/1988 | DeMartino | 252/582 |
| 4,803,688 | 2/1989 | Lawandy | 372/21 |
| 4,828,362 | 5/1989 | Skinner et al. | 350/320 |
| 4,832,466 | 5/1989 | Nishimura et al. | 350/354 |
| 4,938,557 | 7/1990 | Blow | 350/96.15 |
| 5,266,238 | 11/1993 | Haacke et al. | 252/582 |
| 5,281,370 | 1/1994 | Asher et al. | 264/1.1 |
| 5,330,685 | 7/1994 | Panzer et al. | 252/582 |
| 5,338,492 | 8/1994 | Panzer et al. | 252/582 |
| 5,342,552 | 8/1994 | Panzer et al. | 252/582 |
| 5,368,781 | 11/1994 | Hancke et al. | 252/582 |
| 5,452,123 | 9/1995 | Asher et al. | 359/296 |

*Primary Examiner*—Frank G. Font
*Assistant Examiner*—Reginald A. Ratiff
*Attorney, Agent, or Firm*—Baker & Botts, L.L.P.

[57] ABSTRACT

Devices that comprise novel, mesoscopically periodic materials that combine crystalline colloidal array (CCA) self-assembly with the temperature induced volume phase transitions of various materials, preferably poly(N-isopropylacrylamide) (PNIPAM) are disclosed. In one embodiment, a PNIPAM CCA is formed in an aqueous media and contained within cell means. In another embodiment, a CCA of charged particles is formed and polymerized in a PNIPAM hydrogel. Methods for making these devices are also disclosed. The devices of the present invention are useful in many applications including, for example, optical switches, optical limiters, optical filters, display devices and processing elements. The devices are further useful as membrane filters. All of these devices have the feature of being tunable in response to temperature. Devices that change diffracted wavelength in response to pressure are also disclosed.

38 Claims, 5 Drawing Sheets

THERMALLY SWITCHABLE OPTICAL DEVICES

This invention was made with government support under Office of Naval Research Grant No. N00014-94-1-0592 and University of Pittsburgh Material Research Center through the Air Force Office of Scientific Research Grant No. AFOSR-91-0441. The government has certain rights in the invention.

BACKGROUND OF THE INVENTION

1. Field of the Invention

The present invention generally relates to optical devices and methods for making the same. More specifically, the present invention relates to novel, mesoscopically periodic materials that combine crystalline colloidal array (CCA) self-assembly with the temperature induced volume phase transitions of materials that undergo a volume change in response to temperature changes. These materials are used to create tunable optical devices such as optical switches, optical limiters and optical filters that select and/or reject predetermined wavelengths of light. In addition, these materials can be used to create various display devices and processing elements as well as filtering devices whose pore sizes can be varied.

2. Background Art

Charged colloidal particles, when suspended in water, form a stable dispersion due to interparticle coulomb repulsion forces. The property of structural ordering in such dispersions has been exploited in making devices such as narrow band optical rejection filters. The ordering phenomena in such colloidal suspensions has been useful in spectroscopy and Bragg diffraction techniques. See, for example, U.S. Pat. No. 4,627,689. It has been found that mesoscopic, crystalline structures can have many practical applications as optical filters in military, space, medical and research uses. In many such instances, it is necessary or desirable to filter narrow bands of selected wavelengths from a broader spectrum of incident radiation.

Asher, U.S. Pat. No. 4,627,689 discloses a linear crystalline colloidal narrow band radiation filter which is made by forming a highly ordered crystalline colloidal structure within a container. The crystalline colloidal structure is formed by dispersing the ionized particles, for example, polystyrene particles, within an appropriate solvent.

A related disclosure was made in Asher, U.S. Pat. No. 4,632,517. That patent discloses another crystalline colloidal narrow band radiation filter application which forms the basis for a mechanically simple and highly efficient monochromator. It has application in improved systems for investigating Raman or emission spectra of selected sample materials. Both of the aforementioned patents disclose structures that can be used to diffract a narrow band of radiation from a broader band of radiation.

A solid filter and method of making a solid filter from an ordered dispersion of particles within a medium is disclosed in Asher, U.S. Pat. No. 5,281,370. That patent discloses a filter which is capable of Bragg diffracting narrow bands of radiation. It is a solid filter which has many practical applications.

Other filtering devices are also known. For example, U.S. Pat. No. 4,803,688 discloses the use of an ordered colloidal suspension for an optical device.

An optical filter was also disclosed in U.S. Pat. No. 4,548,473. The filter comprises a first substance substantially transparent to light within a select frequency range and having a first index of refraction. The filter also includes a second substance which has at least one resonance frequency within the first frequency range and a second index of refraction which is substantially the same as the first index of refraction at all of the frequencies within the first frequency range except for frequencies near the resonance frequency. This device is based upon resonance scattering by a disordered sample. The device is only a passive device meaning that the index of refraction is not considered to depend upon the incident intensity or time.

U.S. Pat. No. 3,620,597 discloses a device which is capable of acting as a nonlinear absorber of substantially all radiant energy in excess of a predetermined intensity. The mechanism utilized by the device is distinct from that of the present invention.

U.S. Pat. No. 4,832,466 discloses an optical element including a modulating liquid layer composed of a solvent containing a soluble polymer. The device requires polymers to precipitate from solution due to temperature changes. This is not required by the present invention.

U.S. Pat. No. 4,648,686 discloses an optical switch array which utilizes the temperature dependent characteristics of the index of refraction of a crystalline material, however, the device is limited to being used for switching in a waveguide. Other switches for use in waveguides were disclosed in U.S. Pat. Nos. 4,828,362 and 4,938,557.

U.S. Pat. No. 4,268,413 discloses devices having the property of reversibly variable temperature-light absorbance. The device is said to be usable in temperature-measuring devices, slippery ice warning devices and the like.

U.S. Pat. No. 5,452,123 discloses a nonlinear optical device and method for making the same. The method includes making a solid or crystalline colloidal ordered dispersion of charged particles within a medium and introducing into the particles or the medium a radiation responsive component which, when impinged with radiation at a critical density, causes a change in the refractive index of the particles in either the ordered dispersion, the medium or both.

U.S. Pat. Nos. 5,368,781 and 5,266,238 are directed to tunable, narrow band radiation filters comprising a crystalline colloidal array of charged particles fixed in a hydrogel film. Methods for filtering incident radiation using these filters are also disclosed.

U.S. Pat. No. 4,720,355 is directed to a non-linear optical medium having a "host" thermoplastic polymer which contains a "guest" organic component; the organic component has a charge asymmetric electronic structure and exhibits non-linear optical response.

U.S. Pat. Nos. 5,330,685, 5,338,492 and 5,342,552 are all directed to narrow band radiation filters comprising a CCA of charged particles in a polymeric hydrogel.

None of the above patents disclose the unique devices of the present invention. There remains a need, therefore, for optical devices that diffract a narrow predetermined wavelength band and are easily tunable in terms of diffraction efficiency and the wavelength region diffracted.

SUMMARY OF THE INVENTION

These and other needs are satisfied by the present invention which provides optical devices useful as optical switches, optical limiters and/or optical filters that are responsive to changes in temperature. "Optical switch" as used herein refers to an optical device that diffracts a particular wavelength of light weakly at one temperature and strongly at another temperature; such a device is therefore "switched" off or on by changing the temperature. "Optical filter" as used herein refers to an optical device that allows all light but that of a given wavelength to pass through; the diffracted wavelength can be changed or tuned by changing the temperature. "Optical limiter" as used herein refers to an optical device that allows transmission of radiation below a certain threshold intensity, but transmission decreases at higher light intensities. The term "band" of wavelengths will be understood by those in the art to refer to a span of wavelengths. This band can be narrow, with a width of less than one nanometer, or broad, encompassing many nanometers.

The devices of the present invention function to selectively and effectively diffract a narrow band of wavelengths from a broader spectrum of incident radiation while transmitting adjacent wavelengths to a high degree. For example, the optical devices of the present invention can filter out greater than about 99 to 99.9% of a wavelength band of about 20 to 500 Å while transmitting more than about 70 to 90% of the intensity of remaining wavelengths.

Methods for making these optical devices are also disclosed. Generally these methods involve creating a crystalline colloidal array, which are formed by electrical repulsive forces between particles which each have a charge of the same polarity. These particles self assemble to form the crystalline colloidal arrays (CCA) of the present invention. One embodiment of the present invention is directed to a CCA of poly(N-isopropylacrylamide) (PNIPAM) particles in water, contained within a cell. Another embodiment of the present invention is directed to a CCA of polystyrene or other charged particles embedded in a PNIPAM gel. Other materials that undergo a volume phase transition in response to temperature changes can also be used, such as poly(N-tert-butylacrylamide).

The optical devices of this invention can form the basis for mechanically simple and highly efficient optical switches, optical limiters, optical filters and tunable optical filters useful in many applications including, but not limited to, light shutters, optical computers, sensor protection in scientific and medical instrumentation, eye protection for laser welding, display devices, computer applications and laser applications such as laser surgery. The devices are also useful for many military applications. Overall, the devices can be used with any product in which the disclosed radiation filtering characteristics are desirable. In addition, the present technology can be used to create efficient membrane filters for size separation.

It is an object of the present invention to provide an optical switching device which can operate to Bragg diffract certain wavelength bands of incident light.

It is a further object of the present invention to provide an optical switching device that increases or decreases diffraction intensity in response to temperature changes.

It is another object of the invention to provide a device that functions as an optical limiter.

It is a further object of the invention to provide an optical switch or an optical limiter that operates to block transmittance of wavelengths of radiation within several microseconds or in longer or shorter periods, if desired.

It is a further object of the invention to provide a method of creating an optical device that can effectively filter 99% of the incident radiation.

It is another object of the invention to provide such a method and device that are adapted to be employed in the optical limiter embodiments or in the optical switch embodiments.

It is another object of the present invention to provide an optical device that filters a narrow band of wavelengths from a broader spectrum of incident radiation while transmitting adjacent wavelengths to a high degree.

It is a further object of the invention to provide such an optical filter that can be tunable across the UV, visible and IR spectrum in response to temperature.

It is another object of the invention to provide devices that can be used in display devices and computer applications.

Another object of the invention is to provide devices useful as wavelength tunable mirrors.

A further object of the invention is to provide devices useful for the filtering of particles; this device can be used as a membrane filter whose pore size is adjusted in response to temperature changes.

These and other objects of the invention will be more fully understood from the following description of the invention.

DESCRIPTION OF THE PREFERRED EMBODIMENTS

The present invention is directed to novel optical devices and methods of making the devices. The present invention is further directed to methods of using these devices as optical switches, optical limiters and/or optical filters.

The optical devices of the present invention generally comprise an ordered crystalline colloidal array (CCA) that can be either a dispersion of ionized colloidal particles in an appropriate solvent or a solid version consisting of an array embedded in a hydrogel matrix. Either the colloidal particles or the hydrogel matrix are made of a material that undergoes a volume phase transition in response to temperature changes. More specifically, the colloidal particles used to form a CCA according to one embodiment, are particles of any material that exhibits a particle volume change in response to temperature changes. The material used to form the matrix, according to another embodiment of the present invention, can be any material that forms a gel that changes spatial dimension as a function of temperature. Although it will be appreciated that any materials having the above-described characteristics can be used, preferred for both of these embodiments is poly(N-isopropylacrylamide). Thus, these optical devices preferably comprise crystalline colloidal arrays (CCA) of poly(N-isopropylacrylamide) (PNIPAM) colloids in a suitable solvent, or CCA of polystyrene or other particles polymerized in PNIPAM hydrogel. PNIPAM exhibits a temperature induced volume phase transition. Accordingly, the optical devices of the present invention have the feature of being "switchable" and/or "tunable" in response to temperature changes.

Because of the use of temperature responsive materials, the optical devices of the present invention are dynamically tunable and/or switchable either with regard to the size or the periodicity of the array. This switchability feature results from the change in the volume of these materials that accompanies a change in temperature. For example, PNIPAM in water below about 30° C. is hydrated and swollen, but undergoes a reversible volume phase transition from this hydrated, swollen state to a dehydrated, collapsed state when heated above its lower critical solution temperature of about 32° C. Such a temperature increase causes the polymer to expel water and contract into a hydrophobic polymer state. This volume phase transition is used in the various embodiments of the present invention to create switchable or tunable optical devices.

Figure 1:
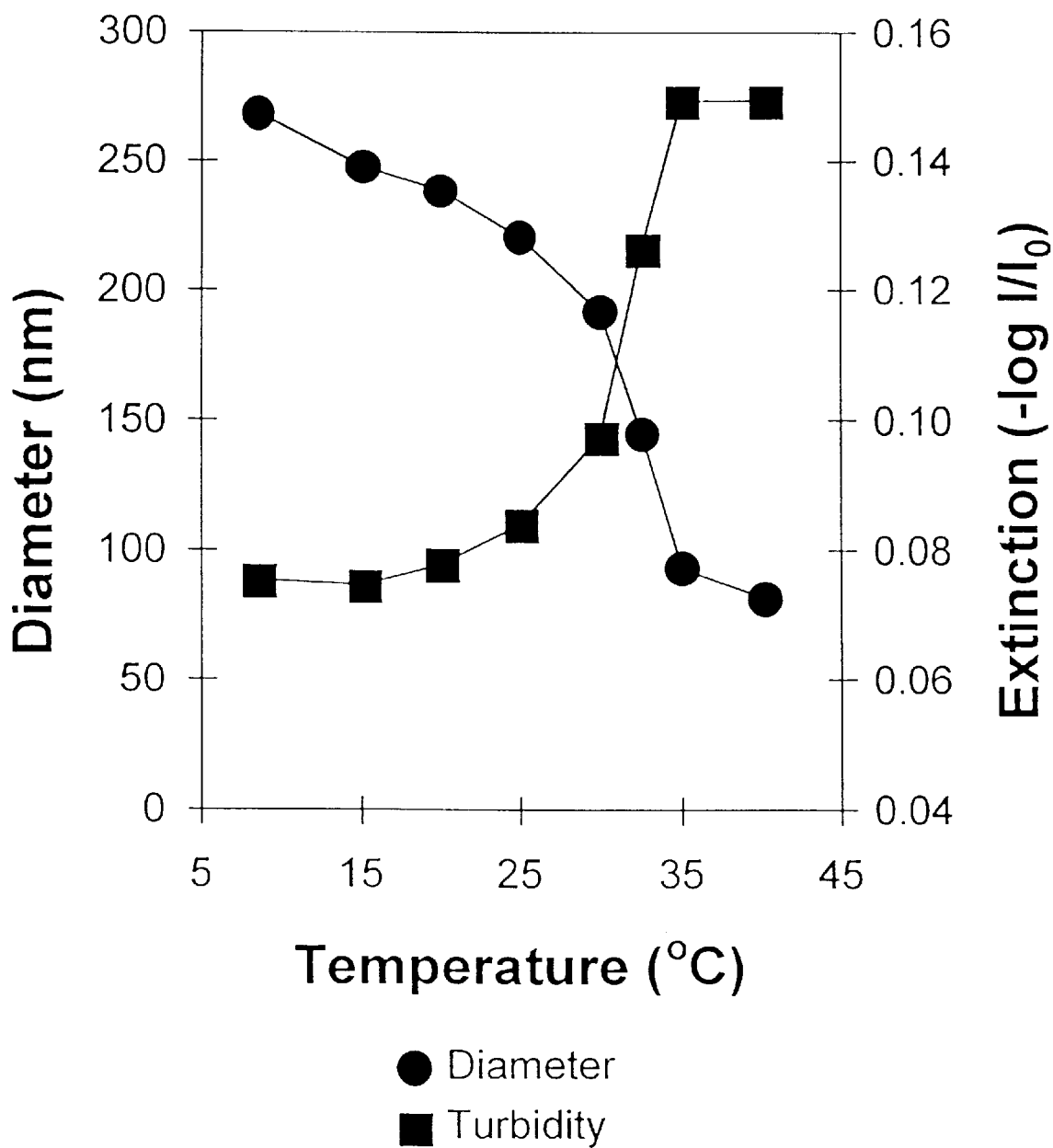
FIG. 1 demonstrates the temperature dependence of the diameter and turbidity of a disordered suspension of PNIPAM colloid as determined by the methods of Example 2.

FIG. 1 illustrates the temperature dependence of the diameter and the turbidity of a dilute suspension of PNIPAM colloid. The sphere diameter increases from about 100 nm at 40° C. to about 300 nm at 10° C.; this corresponds to an approximate 27-fold increase in volume. The turbidity of the PNIPAM suspension increases as the sphere diameter decreases at higher temperatures because the size and particle refractive index of the PNIPAM spheres are related.

One embodiment of the present invention is generally directed towards an optical device comprised of a CCA formed from the self-assembly of PNIPAM colloids. It is a feature of such an optical device that the size of the PNIPAM colloids in the array can be altered or switched in response to temperature. This size change results in a change in the colloid particle refractive index and therefore the diffraction intensity of the device. This intensity differential allows the device to function as a diffraction intensity switch. The device may operate as a high speed optical switch in that it becomes opaque to radiation within the nanosecond to microsecond range.

Monodisperse, highly charged colloidal particles dispersed in very low ionic strength liquid media self-assemble due to electrostatic repulsion to form CCA. These ordered structures are either body-centered cubic (BCC) or face-centered cubic (FCC) arrays with lattice constants in the mesoscale range (50–500 nanometers (nm)). Just as atomic crystals diffract x-rays meeting the Bragg condition, CCA diffract ultraviolet (UV), visible and near infrared (IR) light. CCA can be prepared as macroscopically ordered arrays from non-close packed spheres. Such arrays exhibit highly efficient Bragg diffraction; nearly all light meeting the Bragg condition is diffracted, while adjacent spectral regions not meeting the Bragg conditions will freely transmit. "Non-close packed spheres" refers to an ordering wherein the spheres are spaced by some distance from each other.

The Bragg diffraction law is represented by the following formula:

$$m\lambda = 2\,nd\sin\theta$$

where m is the order of diffraction, $\lambda$ is the wavelength of incident light, n is the suspension refractive index, d is the interplanar spacing, and $\theta$ is the angle between the incident light and the crystal planes.

Highly charged colloidal particles of PNIPAM can be prepared by dispersion polymerization of N-isopropylacrylamide with an ionic co-monomer and a crosslinking agent. A surfactant can optionally be added to make the colloids more monodisperse, which aids in preparation of the CCA. A free-radical initiator should also be added to initiate the polymerization. The polymerization can be run in water, preferably ultrapurified water, at a temperature of at least about 40° C., preferably about 70° C., for a sufficient length of time to allow the reaction to go to completion, typically at least about 30 minutes, preferably about 3 to 4 hours.

A preferred ionic co-monomer for use in the polymerization is 2-acrylamido-2-methyl-1-propanesulfonic acid; other suitable ionic co-monomers include the sodium salt of styrene sulfonate, 3-sulfopropyl methacrylate potassium salt, vinylsulfonate, and 1-sodium, 1-allyloxy-2-hydroxypropanesulfonate. Any other ionic co-monomers can be used, absent compatibility problems. Use of an anionic co-monomer in the polymerization process has the effect of increasing surface charge density on the suspended copolymer particles. The increased surface charge increases the electric forces that form and strengthen the crystalline array.

Preferred crosslinking agents are N,N'-methylenebisacrylamide and methylenebismethacrylamide. Upon polymerization, the crosslinking agents form a crosslinked polymer network which keeps the colloidal particles intact. A weight ratio of crosslinking agent to PNIPAM of from about 1:5 to 1:200 is preferred. Generally, the more crosslinking agents used the higher the rigidity and lower the responsivity of the colloid particles. Thus, the amount of crosslinker can be altered to create the desired response in the optical device.

A preferred surfactant is sodium dodecyl sulfate and a preferred free-radical initiator is potassium persulfate. Other suitable free radical initiators for use in the present invention include benzoin methyl ether, benzoin ethyl ether, succinic acid peroxide, 2-hydroxy-2-methyl-1-phenylpropan-1-one, 4-(2-hydroxyethoxy)-phenyl-(2-propyl)ketone, 2,2'azobis (2,4-dimethyl-4-methoxyvalero)nitrile, and azobisisobutyronitrile. Catalytic amounts of the initiator, usually about 1 to 10 weight %, are effective for the purpose of the invention. Initiators are preferably employed in amounts of about 4 weight % based upon total weight of the monomers.

As will be appreciated by one skilled in the art, any other suitable ionic co-monomers, crosslinkers, surfactants and free-radical initiators can be used, absent compatibility problems.

The particles should then be purified by any means known in the art. Preferably, purification is accomplished by ultracentrifugation, dialysis and/or ion exchange resin. Purification helps to ensure self-assembly of the CCA, which generally needs to take place in a very low ionic strength medium.

Following polymerization, the particles may be stored in an ion exchange resin, preferably in a bath of 10% by weight suspension of ion exchange resin such as analytical grade AG501X8 mix bed resin commercially available from Bio-Rad of Richmond, Calif. The ion exchange resin should preferably be cleaned prior to use through a suitable procedure such as that taught by Vanderhoff et al. in the *Journal of Colloid and Interface Science*, Vol. 28, pp. 336–337 (1968).

Dispersion polymerization of PNIPAM at temperatures of about 70° C. yields collapsed colloidal spheres in the 60 to 120 nm diameter range. These small colloidal particles exhibit the same volume response to temperature as conventional PNIPAM gels.

Figure 2:
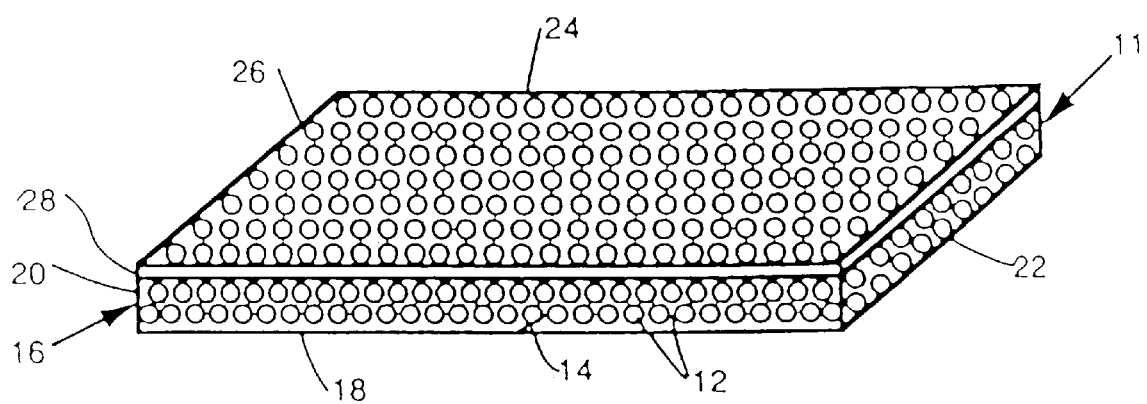
FIG. 2 is a schematic illustration of colloidal particles dispersed within a medium which particles have undergone self-assembly to form a CCA in accordance with one aspect of the present invention.

As illustrated in FIG. 2, the PNIPAM particles 12 in water 14 are contained within a chamber 16 sufficient in size to hold the CCA that is formed. The concentration of particles 12 in the water 14 in this step determines at what wavelength the CCA will diffract light. Generally, the more water the lower the concentration of particles and the longer the wavelength to be diffracted. The chamber 16 is preferably composed of quartz, LEXAN®, or LEXAN® coated glass. LEXAN® is a thermoplastic carbonate-linked polymer produced by the reaction of bisphenol A and phosgene. Chamber 16 has bottom portion 18 and upstanding sidewalls 20, 22, 24 and 26. Chamber 16 is sealed with airtight cover 28. Sealed chamber 16 is then held at room temperature for a period of time adequate to allow the array to crystallize. The highly charged colloidal PNIPAM particles self-assemble to form a CCA, as shown in the figure. The chamber should not be disturbed during formation of the CCA. Preferably, the chamber is transparent, for use of the device in optical applications.

These CCA will form both above and below the PNIPAM phase transition temperature. The CCA can be formed in any suitable solvent. As used herein, the term "suitable solvent" refers to any solvent that is compatible with the PNIPAM, or other suitable material being used, will promote the formation of CCA and will allow the CCA to undergo a volume phase transition in response to temperature changes. The preferred solvent is deionized water.

A CCA of hydrated, swollen particles weakly diffract light, but CCA of compact particles diffract efficiently. The particle concentration within the chamber when the optical switch is being used determines the wavelength that is diffracted and the temperature of the particles determines whether light of the wavelength is weakly or strongly diffracted, i.e. whether the optical switch is "off" or "on".

Figure 3:
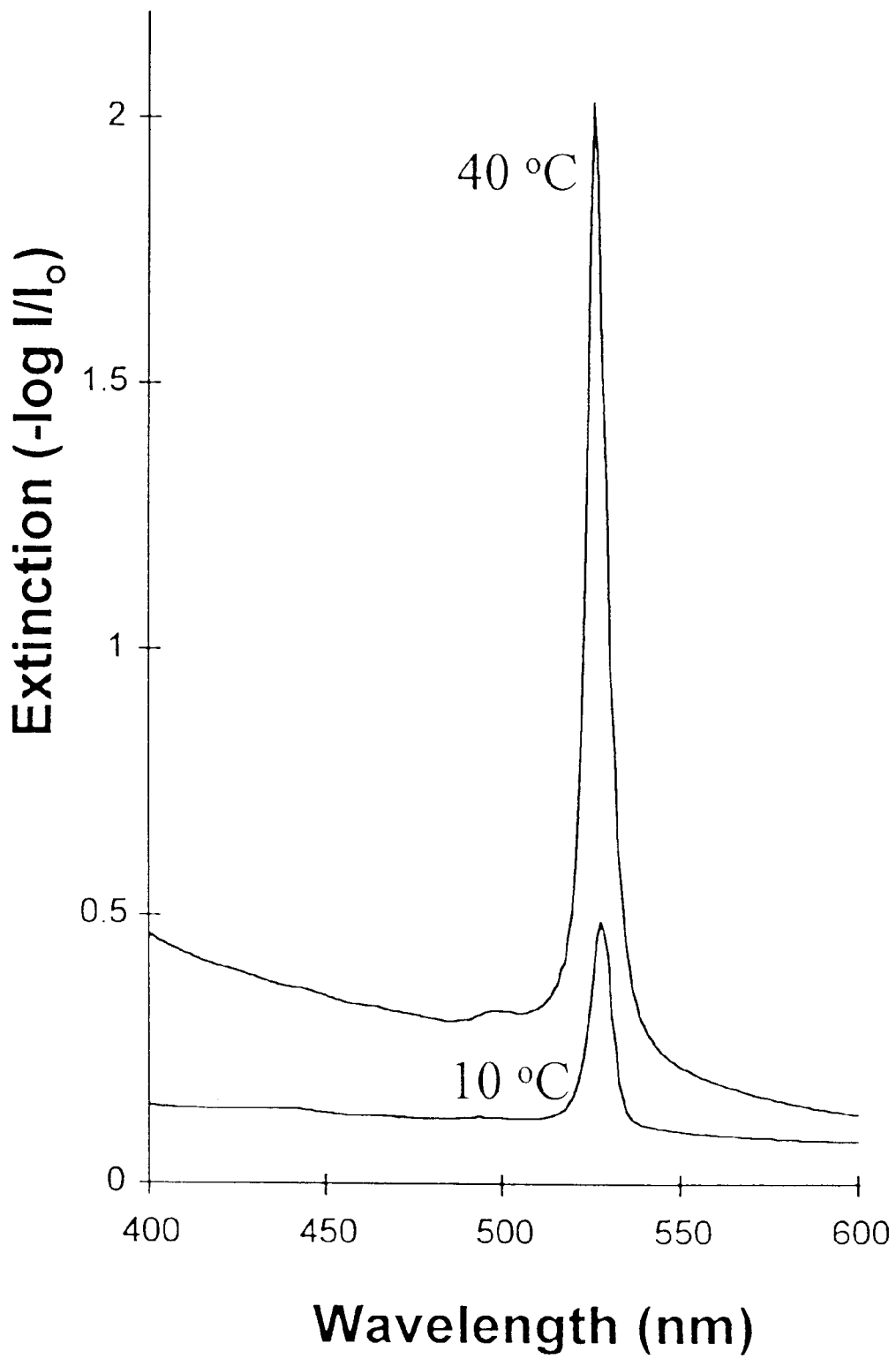
FIG. 3 is a graph depicting the diffraction from a CCA of PNIPAM at 10° C. and at 40° C. as determined according to the methods of Example 3.

FIG. 3 shows the extinction spectrum of a PNIPAM CCA at both 10 and 40° C. The lattice constant of the BCC array is 342 nm and the nearest neighbor sphere distance is 242 nm. At low temperatures the particles are highly swollen and almost touching. In this state, the diffraction efficiencies of the CCA are small. Above the transition phase, however, the particles become compact and diffract nearly all incident light at the Bragg wavelength. Thus, the compact sphere CCA diffracts light much more efficiently than the swollen sphere CCA. This is due to the higher refractive index mismatch for the compact spheres. While the temperature change does affect the diffraction intensity of these devices, it does not affect the lattice spacing. The 1 nm shift of the maximum wavelength diffraction upon heating from 10° to 40° C., shown in FIG. 3, results almost entirely from the change in refractive index of water.

The diffraction efficiency of the CCAs depends on the scattering cross-section of the colloidal particles as well as the array ordering. The particle size change results in a change in the sphere scattering cross-section, which in turn significantly changes the diffraction intensity or efficiency of the array. Thus, the PNIPAM CCA functions as a thermally controlled optical switch that can be activated or deactivated by changing the temperature to which the device is exposed.

Changing the temperature of the CCA can be accomplished by any means known in the art. For example, the CCA can be placed in an oven, hot or cold water, or the cell which contains the CCA can be heated or cooled.

In another embodiment, an optical limiter is prepared by attaching an absorbing dye, preferably a photoabsorptive, non-luminescent dye, to the PNIPAM colloidal particles, before the CCA is assembled. Suitable dyes for this purpose include but are not limited to basic fuchsin (color index 42500), Bismarck Brown Y (color index 21000) and Acridine Yellow G (color index 46025). The dye absorbs radiation and generates heat which causes the particles of the CCA to shrink. The refractive index of the particles is highly temperature dependent and as the particles shrink the refractive index increases. The thermally induced change in refractive index occurs within several microseconds and changes the optical behavior of the device. The ordered array diffracts more strongly as the particles shrink. In this way, the material acts as an optical limiter and Bragg diffracts a predetermined wavelength band of incident radiation. The wavelength diffracted is determined by the spacing and crystal structure of the array.

In another embodiment of the present invention, wavelength tunable diffraction devices are created by polymerizing a CCA of electrically charged particles within a hydrogel matrix to create a polymerized CCA (PCCA) film. These films use the volume phase transition properties of a polymerized medium, such as PNIPAM gel, to control the periodicity of the CCA. The optical filters thus created have the ability to selectively diffract and thereby filter a narrow band of radiation from a broader band of incident radiation. Materials for filtering particles can also be created.

The first step in preparing the devices of this embodiment is to prepare the charged particles. Monodisperse particle colloids can be prepared by emulsion polymerization, or by other means. For example, an emulsion polymer can be prepared by mixing the desired monomer with a crosslinking agent, a surfactant to aid in the formation of the emulsion, a buffer to keep the pH of the solution constant and to prevent particle coagulation, and a free-radical initiator to initiate polymerization. In a preferred embodiment, the monomer is styrene, the crosslinking agent is divinylbenzene, the surfactant is sodium-di(1,3-dimethylbutyl)sulfosuccinate, the initiator is potassium persulfate and an ionic comonomer is also added, preferably 1-sodium, 1-allyloxy-2-hydroxypropane sulfonate. Other compounds can also be used to prepare the emulsion polymer, as long as compatibility problems do not arise. The particles should be purified by use of centrifugation, dialysis and/or an ion exchange resin, if necessary, so that a CCA will form. Alternatively, electrically charged particles that can be used in accordance with this embodiment are commercially available from Dow Chemical or Polysciences, Inc. Purification of the commercially available particles is also recommended.

The electrically charged particles are then dispersed in an aqueous solution containing N-isopropylacrylamide, a crosslinking agent and UV photoinitiator. Alternatively, any material that undergoes a volume phase transition in response to temperature changes can be used instead of N-isopropylacrylamide, including but not limited to poly(N-tert-butylacrylamide). Any crosslinking agent discussed with regard to the first embodiment can also be used. Preferred is N,N'-methylenebisacrylamide. Preferred ratios of crosslinking agent to monomer are about 1:5 to 1:20, more preferably about 1:8 to about 1:12 and most preferably 1:9. In addition to forming the polymer network in the CCA, the crosslinking agent as used in this step in this embodiment assists formation of the hydrogel and strengthens the resulting hydrogel film so that a self-supporting film results. Hydrogel films can be formed with some retention of the crystalline structure when as little as 1 part in 100 parts by weight of the co-monomer mixture is the crosslinking agent. In addition, a UV photoinitiator can be added; a preferred compound for this use is 2,2'-diethoxyacetophenone. A heat sensitive free radical initiator that can be activated at moderate temperature may also be employed alone or in combination with activating light.

After formation, the mixture is then placed between two plates, preferably quartz plates separated by a parafilm spacer, at a temperature from between about 0° to 10° C. A non-ionic UV photoinitiator can then be used to initiate polymerization. Any other means known in the art can also be used to initiate polymerization so long as the method chosen for polymerization does not destroy or otherwise disorder the CCA. Upon completion of the polymerization, the plates are removed and a stable PCCA results. This film can be approximately about 10 micrometers thick and can be made thicker based upon the needs of the user.

One advantage of the device according to this embodiment of the present invention is that the highly ordered crystalline array of colloidal particles, after it is fixed in the hydrogel by polymerization, no longer depends on the interactive electric forces of charged particles to maintain the crystalline structure. Another advantage is that the optical device can be a self supporting polymeric films or membrane, without the need for cell walls to contain the filter.

The particles used to create the CCA can be any particle selected from the group consisting of colloidal polystyrene, polymethylmethacrylate, silicon dioxide, aluminum oxide, polytetrafluoroethylene or any other suitable materials which are generally uniform in size and surface charge. The particles are chosen for their properties as desired for the particular application. The particles preferably have a diameter between about 50 and 500 nanometers and may be either synthesized as discussed above or obtained commercially.

The PCCA film functions as an easily controlled tunable optical filter. The gel dimensions shrink and expand continuously and reversibly between about 10 and 35° C. and the embedded particle sphere array follows, changing the lattice spacing or distance between the particles of the array. As the lattice spacing changes, the wavelength diffracted by the device also changes. More specifically, as the temperature increases, the lattice spacing decreases and the diffracted wavelength decreases. The diffracted wavelength can therefore be altered by varying the temperature, and is thermally tunable from the far red to the near UV portion of the spectrum. The diffracted wavelength can also be altered by varying the angle at which the light hits the device. At a fixed angle to the incident beam the PCCA acts as a tunable wavelength reflector.

Heating of the PCCA can be effected by any of the means known in the art, such as those discussed above.

The width and height of the diffraction peak can be easily controlled by choosing colloidal particles of different size and refractive index or by making different thickness PCCA films. Generally, larger particles will diffract more strongly and at a wider wavelength band; smaller particles have a weaker diffraction but diffract over a narrower band of wavelengths. Generally, a thicker PCCA will diffract more than a thinner PCCA, because each "layer" of the PCCA will diffract a certain amount of light thereby exhibiting a cumulative effect with multiple layers. The tuning range of the device can be widened or narrowed by synthesizing PCCA films with higher or lower concentrations of crosslinking agents, respectively. The amount of crosslinking agent largely determines the rigidity of the CCA. The more crosslinker added, the stiffer the CCA and the smaller the radiation band over which the device can be tuned.

Figure 4:
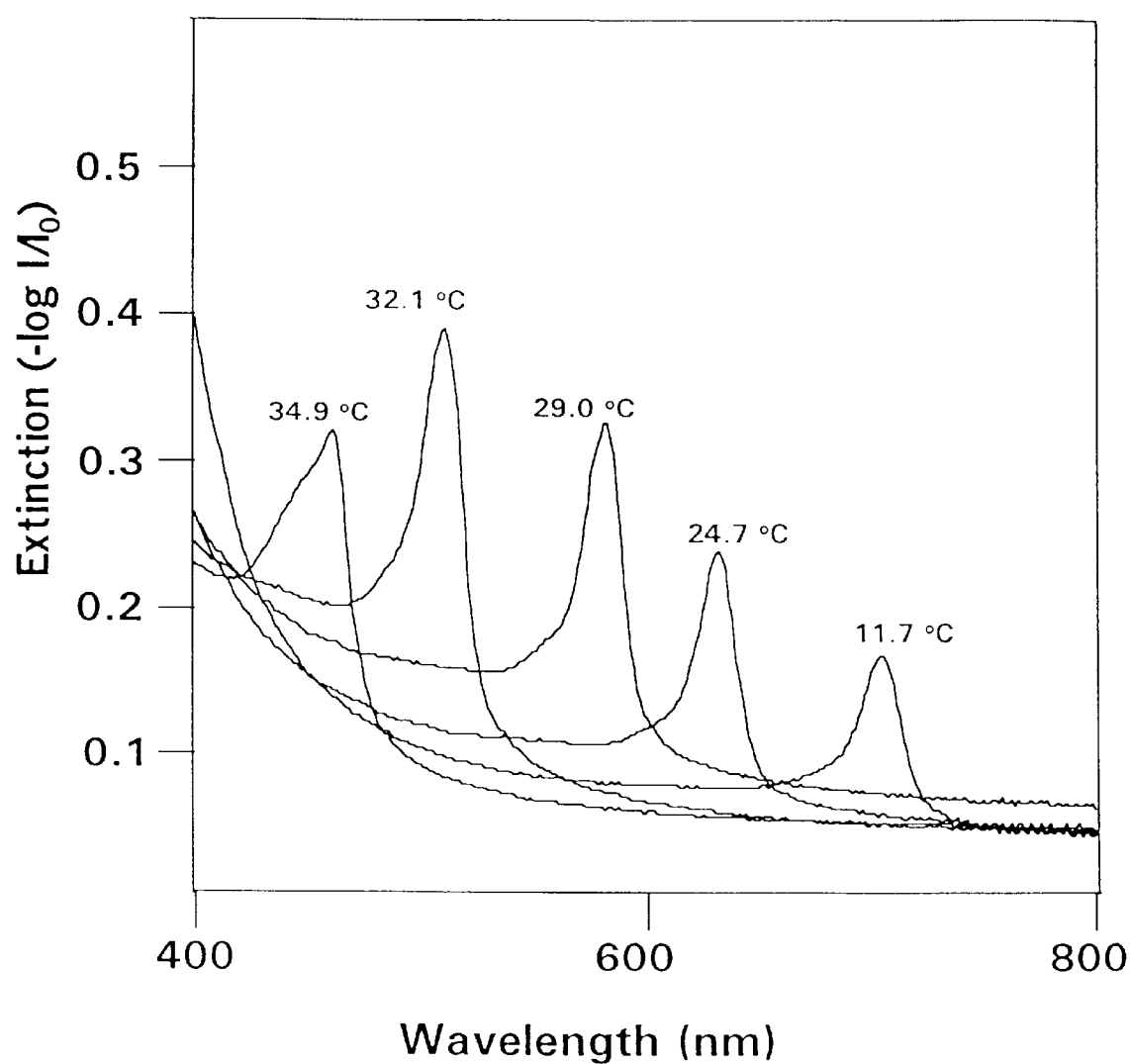
FIG. 4. is a graph depicting the temperature tuning of Bragg diffraction from a 125 micrometer thick film of a PCCA of 99 nanometer polystyrene spheres embedded in a PNIPAM gel as determined by the methods of Example 5.
Figure 5:
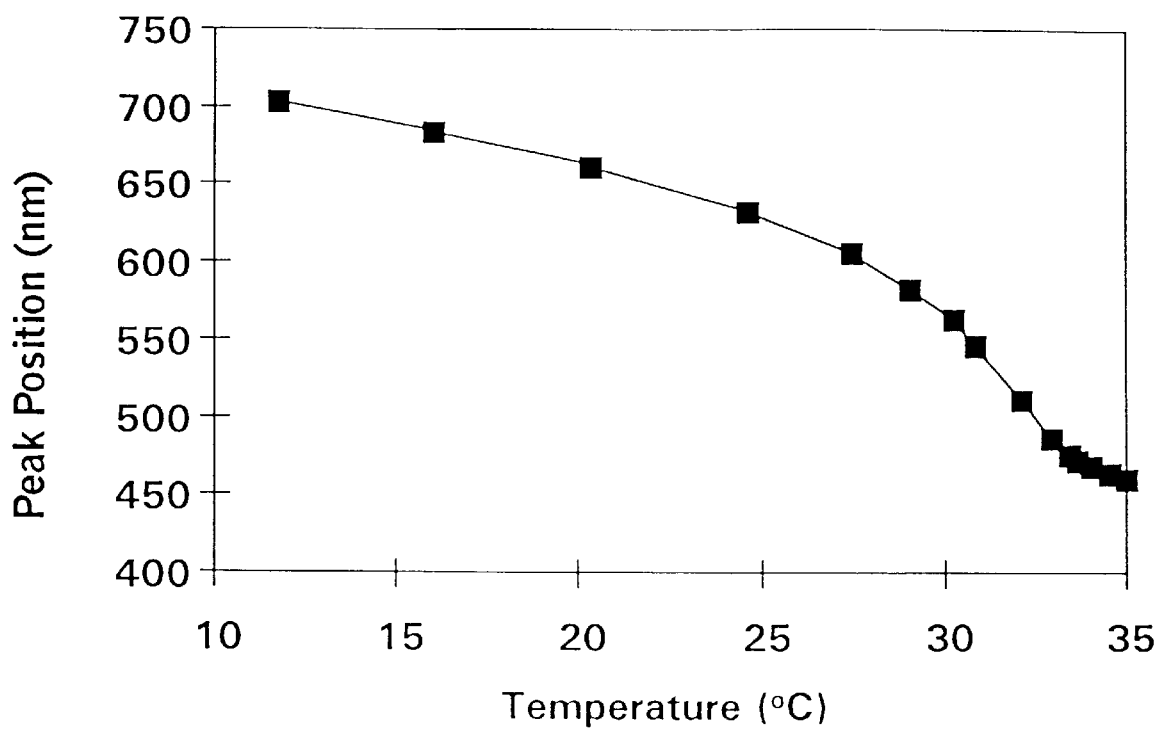
FIG. 5 is a graph depicting the temperature dependence of the diffracted wavelength for a PCCA according to one embodiment of the present invention.

FIG. 4 shows that the diffracted wavelength for the prepared PCCA film can be tuned between about 400 and 700 nanometers by varying the temperature. One skilled in the art will appreciate that this nanometer range can be made even broader. FIG. 5 shows the temperature dependence of the diffracted wavelength for the PCCA film where the incident light is normal to the (110) plane of the BCC lattice. In addition to the change in the diffracted wavelength, the diffraction peak intensity increases as the volume decreases. This is because the diffraction intensity is proportional to the density of scatterers per layer, which increases as the material shrinks.

A volume phase transition can also be effected by changing the solvent in which the PCCA is contained. Many polymers undergo some reversible conformational change with changes in the solvent to which they are exposed. Thus, a PCCA in water may have one volume, and therefore one diffraction wavelength region, and have a different volume and therefore a different diffraction wavelength region when taken out of water and placed in an organic solvent. Examples of organic solvents which might induce volume changes include glycerol, ethylene glycol, methanol, ethanol, dimethylsulfoxide, phenylmethylsulfoxide, dioxane, dimethylformamide, polyethyleneglycol, and acetonitrile and mixtures of these and other solvents.

The optical devices of the present invention, wherein a CCA is formed from, for example, PNIPAM colloids in water, and is contained within cell means, can also be used in thin, two dimensional reflective and/or transmittive display devices. As stated above, the CCA diffracts light with a temperature tunable efficiency controlled by the temperature tunable sphere diameter. A local temperature increase within the CCA will cause the PNIPAM CCA spheres in the heated area to shrink and therefore diffract more efficiently than the non-heated area. Thus an image is created in the CCA that reflects the light of the color defined by the CCA diffraction wavelength region and with an intensity determined by the temperature. This application is particularly advantageous in that the present devices can be used for display applications in bright environments, such as sunlight. In addition, stacking films that reflect light of different colors, such as by stacking red, green and blue films, a thin-film color display device can be created.

For example, a display device comprising three stacked layers can be created in which each layer comprises a crystalline colloidal array of charged particles containing a light absorbing dye in an aqueous medium contained with cell means. Each layer has a different light absorbing dye, so that each dye absorbs a different, predetermined wavelength of light. In a preferred embodiment, one layer has a dye that absorbs green, one that absorbs red and one that absorbs blue. Three light sources, each having different wavelengths and corresponding with one of said light absorbing dyes, are used. The intensity of the light sources determines the amount of heat applied to each of said layers. Thus, excitation of the stacked layers by the three lights controls the intensity of the colors in each layer. Differential heating results in the appropriate combination of red, green and blue to produce the desired color.

Any means known in the art for effecting localized heating and for assembling such display devices can be employed. For example, the CCA may be self assembled between two quartz plates. Each of these quartz plates is equipped with narrow transparent metal strips, such as indium tin oxide strips, which are on the inside surface of the plate and thus in contact with the CCA. The two plates are further oriented such that the two sets of strips are perpendicular to each other. A localized voltage difference across the plates will cause current flow and localized heating of the region between the strips; the light diffraction will increase in the area that is heated and a color observed.

Another method of creating display devices is to use thin wires in a crisscrossed pattern on the surface of only one of the plates. A current flowing across a pair of crisscrossed wires will increase the temperature in the area where the wires cross.

Localized heating to effect the desired thermally induced color intensity change could also be effected through the use of electrical resistance materials of suitable resistivity.

In addition, such display devices can be created by use of electronic circuitry on glass or quartz plates. The circuitry would be designed in such a way that the current flowing through the circuitry adjacent to a pixel area heats that area desired size. Thus, the user can control the limiting pore size to decide what size particles the filter can remove, and the pore size may be easily monitored by examining the wavelength of diffracted light and applying Bragg's law.

The pore size of these filtration membranes should be adjusted to be less than or equal to the particles to be filtered. The material to be filtered impinges upon the gel membrane filter and the membrane filter resists passage of the macromolecules or particles through the membrane interstices. These filters can then be used to filter submicron, or larger, particles. Alternatively, these PCCA can be polymerized onto a thick fiber-reinforced PNIPAM hydrogel having similar temperature induced volume changes. The resulting filter would have interstitial pore sizes that are continuously variable by setting the lattice parameter, and by changing the temperature of the filtering solution between about 10 and 40° C. This would allow for temperature selection of the exact pore size desired. As will be appreciated by one skilled in the art, the hydrogel can be made from any monomers, including but not limited to acrylamide monomers, that undergo a volume change in response to temperature and/or solvent changes.

The PCCA of the present invention has further application as a temperature sensor that monitors temperature. For example, the PCCA could be applied to a surface; as the temperature changes, the color of the PCCA would change, with an increase in temperature shifting the diffracted wavelength towards the blue region.

In yet another embodiment, the devices of the present invention can be used as pressure sensors. As the pressure on these devices changes, the lattice spacing of the particles in the array would also change. Thus, pressure changes would be detected by changes in the color diffracted by the array. Because of the responsivity of the devices of the present invention to temperature, temperature should be kept constant while measuring pressure changes. Alternatively, materials that do not exhibit a volume phase transition in response to temperature can be used.

EXAMPLES

The following examples are intended to illustrate the invention and should not be construed as limiting the invention in any way. thereby controlling the intensity of the color of the pixel. Other electronic means known to those skilled in the art could be used as well.

In yet another method of creating a display device, a scanning laser or light beam is used to write a temperature pattern in the CCA. An absorbing dye, transparent in the visible spectral region, is incorporated in the CCA. Illuminating said dye heats the CCA through light absorption. The CCA would diffract light more efficiently in the heated regions.

A thin, two-dimensional reflective display device can also be made by using the PCCA discussed above. Because the PCCA diffracts different colors at different temperatures, such a device can be used in creating a multi-colored display. This effect is achieved by heating different portions of the PCCA to different temperatures. Heating can be effected by the means described above, such as by the use of metal strips that conduct a current, electrical resistance materials, electronic circuitry or light absorbing dyes that generate heat upon exposure to light.

These display devices have numerous applications in computer technology, including but not limited to various processing elements and display devices.

The PCCA of the present invention can also be used as a tunable filtration membrane. The PCCA material has two different types of pores within it, the first resulting from the hydrogel network and the second resulting from the interstitial spaces of the crystalline lattice. The gel pore size is related to the synthetic parameters of hydrogel formation, such as monomer and crosslinker concentrations, temperature, and solubility of the monomers and polymer chains. The gel can be synthesized so that this pore size may range from as small as 1 nm to as large as 1 micrometer. The interstitial pore size is a function of the lattice spacing and of the diameter of the particles in the CCA. This pore size may be controlled from about 5 nm to about 500 nm. The PCCA can be made such that the hydrogel pores are larger than the interstitial pores, so the interstitial pores will be the limiting factor controlling the passage of large molecules, such as DNA, or other small particles through the material. The size of the interstices in a PNIPAM PCCA can be selected by controlling the temperature and swelling or shrinking the gel, or by placing the PCCA in a solvent that will swell or shrink the gel to the

Example 1

Dispersion polymerization was performed to form charged particles of N-isopropylacrylamide for use in forming CCA. Polymerization was effected by using about 3.47 g of N-isopropylacrylamide, 0.03 g of 2-acrylamido-2-methyl-1-propanesulfonic acid, 0.105 g of N,N'-methylenebisacrylamide, 0.080 g of sodium dodecylsulfate and 0.014 g of potassium persulfate. These ingredients were mixed in about 250 ml of ultrapurified water at about 70° C. for approximately 4 hours. After synthesis, the latex was purified by exhaustive ultracentrifugation and subsequent mixing with a mixed bed ion exchange resin.

Example 2

The temperature dependence of the diameter and turbidity of a suspension of PNIPAM colloid particles prepared according to the methods of Example 1 were determined. The diameter of the sphere was determined using a commercial quasi-elastic light scattering apparatus, specifically a Malvern Zetasizer 4. Turbidity measurements were performed in a 1.0 cm path length quartz cell using a UV-visible-near IR spectrophotometer. Solids content of the sample in the turbidity experiment was 0.071%, which corresponds to a particle concentration of $2.49 \times 10^{12}$ spheres per milliliter. FIG. 1 graphically demonstrates the changes in diameter and turbidity as temperature changes. As can be seen from the graph, the diameter decreased as temperature increased, while turbidity increased as temperature increased. The example demonstrates that the diameter of the particles changes with temperature, and that light scattering from the particles increased with temperature.

Example 3

The diffraction of a CCA of PNIPAM at 10° C. and at 40° C. was determined. Spectra were recorded using a Perkin-Elmer λ-9 UV-visible-near IR spectrophotometer. The suspension was contained in a 1.0 mm quartz cuvette oriented at normal incidence to the incident beam. Switching behavior was reversible; the spectra were recorded after the seventh consecutive heat-cool cycle. The inset depicts the temperature switching between the array of swollen spheres below the phase transition temperature and the identical array of compact spheres above the transition. As can be seen from FIG. 3, the intensity of diffraction from the CCA at 40° C. is considerably greater than that of the array at 10° C. At lower temperatures, weak diffraction was seen but at higher temperatures strong diffraction was seen. Thus, the device can be switched from one intensity of diffraction to another by changing the temperature.

Example 4

A PCCA was synthesized by photopolymerization. About 0.23 g of monodisperse polystyrene colloids (diameter 99 nanometers, 19% solids), 0.35 g N-isopropylacrylamide, 0.02 g of N,N'-methylenebisacrylamide and 0.004 g of diethoxyacetophenone as a UV photoinitiator were used. The mixture was then shaken with an ion exchange resin. The mixture was then placed between two quartz plates separated by a parafilm spacer at about 2.0° C. Photopolymerization was initiated with UV light until polymerization of the hydrogel was complete. The quartz plates were removed. It was further determined that the polymerized film diffracted in a manner similar to the monomeric precursor. This was determined by comparing the diffraction of the PCCA at 2.0° C. with the diffraction of the monomeric precursor.

Example 5

The temperature tuning abilities of a PCCA, prepared according to Example 4, were tested. The PCCA was 125 mm thick and contained polystyrene spheres with diameters of 99 nanometers embedded in a PNIPAM gel. FIG. 4 confirms that the diffraction wavelength shift which results from the temperature-induced volume change of the gel alters the lattice spacing, and hence the wavelength that is diffracted. Spectra were recorded in a UV-visible-near IR spectrophotometer with the sample placed normal to the incident light beam.

As will be understood by one skilled in the art, the present invention provides optical devices which can function as either optical switching devices or optical filtering devices. These devices are unique, in that they utilize the volume phase transition of PNIPAM which results from changes in temperature to control optical properties.

Whereas particular embodiments of this invention have been described above for purposes of illustration, it will be evident to those skilled in the art that numerous variations of the details of the present invention may be made without departing from the invention as defined in the appended claims.

What is claimed is:

1. A thermally activatable radiation filtering device comprising:
    a crystalline colloidal ordered array of charged particles in an aqueous medium;
    cell means for containing said crystalline colloidal array and medium; and
    wherein said charged particles undergo a volume phase transition, while remaining in said ordered array, in response to temperature changes.

2. The device of claim 1, wherein said particles are poly(N-isopropylacrylamide) particles.

3. The device of claim 1, wherein said aqueous medium is water.

4. The device of claim 1, wherein said cell means are made of a material selected from the group consisting of quartz, a thermoplastic carbonate linked polymer, and glass coated with a thermoplastic carbonate linked polymer.

5. The device of claim 1, wherein a photoabsorptive dye is attached to said particles.

6. The device of claim 1, wherein said device is an optical switch.

7. The device of claim 1, wherein said device is an optical limiter.

8. A thermally tunable radiation filtering device comprising a crystalline colloidal array of charged particles polymerized in a hydrogel;
    wherein said hydrogel undergoes a volume phase transition in response to temperature; and wherein said particles remain in said ordered array during said volume phase transition.

9. The device of claim 8, wherein said particles are selected from the group consisting of colloidal polystyrene, polymethylmethacrylate, silicon dioxide, aluminum oxide and polytetrafluoroethylene.

10. The device of claim 9, wherein said hydrogel is a poly(N-isopropylacrylamide) hydrogel.

11. A thin, two-dimensional display device comprising:
    a crystalline colloidal ordered array of charged particles in an aqueous medium;
    cell means for containing said crystalline colloidal ordered array and medium;
    means for heating said crystalline colloidal ordered array; and
    wherein said charged particles undergo a volume phase transition, while remaining in said ordered array, in response to temperature change.

12. The device of claim 11, wherein said heating means is selected from the group consisting of metal strips, a light source used with light absorbing dyes, electrical resistance materials and electronic circuitry.

13. The device of claim 12, wherein said metal strips are indium tin oxide strips that conduct current.

14. The device of claim 11, further characterized as being useful as a processing element in an optical computer.

15. The device of claim 11, further characterized as being useful as a display device in a computer.

16. The display device of claim 11 wherein said display is a monochrome display.

17. The display device of claim 11, wherein said display is a color display.

18. A display device comprising:
    a) three stacked layers each of said layers comprising crystalline colloidal ordered array of charged particles in an aqueous medium, wherein said charged particles undergo a volume phase transition while remaining in said ordered array cell means for containing said crystalline colloidal ordered array and medium, and a light absorbing dye that absorbs a predetermined wavelength of light, wherein each of said layers has a different light absorbing dye than each of said other layers; and
    b) three light sources, wherein each of said light sources is of a different wavelength than each of said other lights, and wherein each of said lights corresponds with one of said dyes such that each light is selectively absorbed by one of said dyes.

19. The display device of claim 18, wherein one of said dyes absorbs blue, one of said dyes absorbs green and one of said dyes absorbs red.

20. The display device of claim 19, wherein said light sources are lasers.

21. A thin, two-dimensional display device comprising:
a crystalline colloidal ordered array of charged particles polymerized in a hydrogel;
means for heating said hydrogel;
wherein said hydrogel undergoes a volume phase transition in response to temperature; wherein said particles remain in said ordered array during said volume phase transition.

22. The device of claim 21, wherein said heating means is selected from the group consisting of metal strips, a light source used with light absorbing dye, electrical resistance materials and electronic circuitry.

23. The device of claim 22, wherein said metal strips are indium tin oxide strips that conduct current.

24. The device of claim 21, further characterized as being useful as a processing element in an optical computer.

25. The device of claim 21, further characterized as being useful as a display device in a computer.

26. The display device of claim 21 wherein said display is a monochrome display.

27. The display device of claim 21, wherein said display is a color display.

28. A display device comprising:
a) three stacked layers each of said layers comprising a crystalline colloidal ordered array of charged particles polymerized in a hydrogel that undergoes a volume phase transition in response to temperature, wherein said particles remain in said ordered array during said volume phase transition, wherein each of said layers further includes a light absorbing dye that absorbs a predetermined wavelength of light, wherein each of said layers has a different light absorbing dye than each of said other layers; and
b) three light sources, wherein each of said light sources is of a different wavelength than each of said other lights, and wherein each of said lights corresponds with one of said dyes such that each light is selectively absorbed by one of said dyes.

29. The display device of claim 28, wherein one of said dyes absorbs blue, one of said dyes absorbs green and one of said dyes absorbs red.

30. The display device of claim 29, wherein said light sources are lasers.

31. A filtering device comprising a membrane filter comprising a crystalline colloidal ordered array of charged particles polymerized in a hydrogel that undergoes a volume phase transition in response to temperature and wherein said filter has gel pores and interstitial pores and at least one of these pore sizes changes in response to temperature, wherein said particles remain in said ordered array during said volume phase transition.

32. The device of claim 21, wherein said particles are selected from the group consisting of colloidal polystyrene, polymethyl methacrylate, silicon dioxide, aluminum oxide and polytetrafluoroethylene.

33. The device of claim 32, wherein said hydrogel is poly(N-isopropylacrylamide).

34. A turnable filtering device comprising a crystalline colloidal ordered array of charged particles polymerized in a hydrogel, wherein said hydrogel undergoes a volume phase transition when moved from a first solvent in which the hydrogel is in a swollen state to a second solvent in which the hydrogel is in a more compact state and wherein said particles remain in said ordered array during said volume phase transition.

35. The device of claim 34, wherein said particles are selected from the group consisting of colloidal polystyrene, polymethyl methacrylate, silicon dioxide, aluminum oxide and polytetrafluoroethylene.

36. The device of claim 35, wherein said first solvent is water and said second solvent is acetonitrile.

37. The device of claim 35, wherein said first and second solvents are independently selected from the group consisting of a solvent and a mixture of solvents.

38. The display device of claim 28, wherein said hydrogel is poly(N-isopropylacrylamide).

* * * * *

UNITED STATES PATENT AND TRADEMARK OFFICE
CERTIFICATE OF CORRECTION

PATENT NO. : 6,014,246
DATED : January 11, 2000
INVENTOR(S) : Asher et al.

It is certified that error appears in the above-indentified patent and that said Letters Patent is hereby corrected as shown below:

ON THE COVER:

ABSTRACT, line 7: "media" should read --medium--;

Column 5, line 44: "structurcs arc cithcr body-ccntcred" should read --structures are either body-centered--; and "facc-" chould read --face- --;

Column 11, line 52: Delete "thereby controlling ... etc.," through col. 12, line 29, and insert entire block of deleted text at col. 11, line 12, before "to decide ... etc.";

Column 13, line 48: "tcmpcraturc" should read --temperature--; and "propcrtics" should read --properties--;

Column 13, line 62: "medium; and" should read --medium--;

Column 14, line 4: "hydrogel;" should read --hydrogel,--.

Column 14, line 31: "and" should be deleted;

Column 14, line 51: "layers each" should read --layers, each--;

Column 14, line 52: 'crystalline" should read --a crystalline --;

Column 14, line 55: "array cell" should read --array, cell--;

Column 15, line 5: "hydrogel;" should read --hydrogel; and--;

Column 15, line 6: "hydrogel;" should read --hydrogel, --;

Column 15, line 8: "temperature; wherein" should read --temperature, and wherein--;

Column 15, line 26: "layers each" should read --layers, each--;

Column 15, line 33: "light, wherein" should read --light, and wherein--;

UNITED STATES PATENT AND TRADEMARK OFFICE
CERTIFICATE OF CORRECTION

PATENT NO. : 6,014,246
DATED : January 11, 2000
INVENTOR(S) : Asher et al.

It is certified that error appears in the above-indentified patent and that said Letters Patent is hereby corrected as shown below:

Column 16, line 14: "claim 21" should read --claim 31--;

Column 16, line 21: "turnable" should read --tunable--.

Signed and Sealed this

Tenth Day of April, 2001

Attest:

NICHOLAS P. GODICI

Attesting Officer     Acting Director of the United States Patent and Trademark Office